Figure 1:
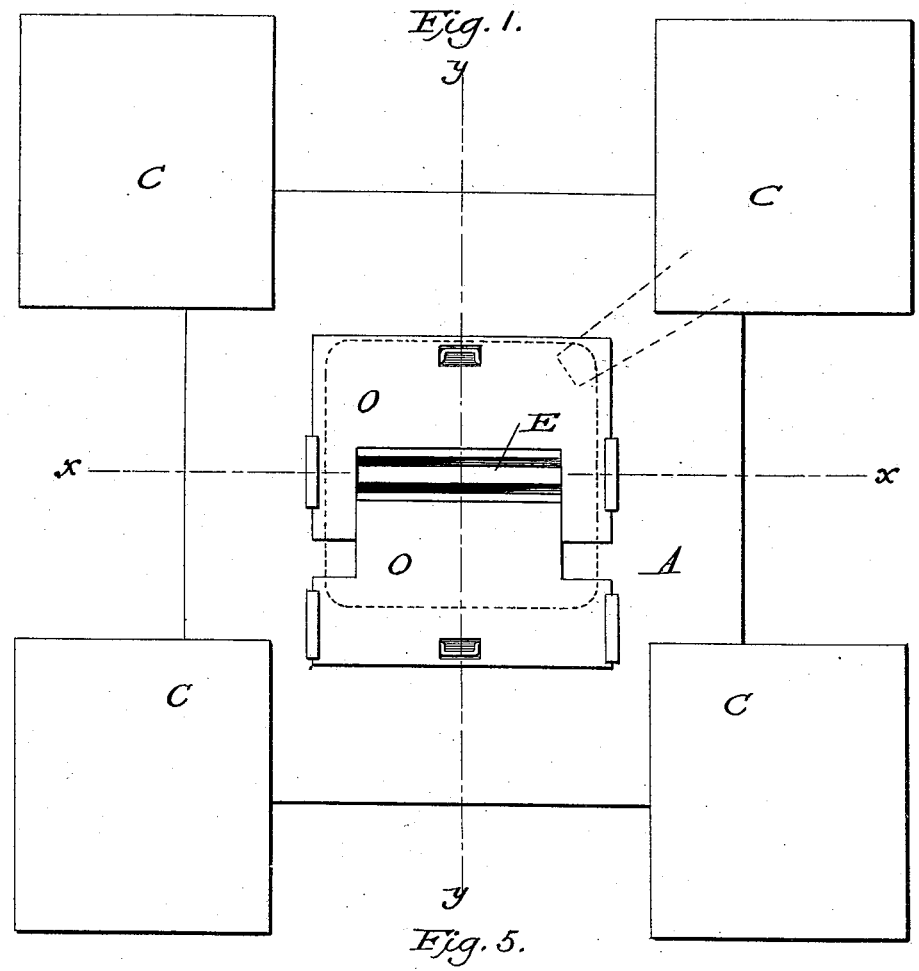

(No Model.) 3 Sheets—Sheet 1.

R. S. PEASE.
MANUFACTURING GLASS.

No. 444,560. Patented Jan. 13, 1891.

Witnesses:
James F. Duhamel.
Horace A. Dodge.

Inventor:
Roger S. Pease,
by Dodge Sons,
Attys.

THE NORRIS PETERS CO., PHOTO-LITHO., WASHINGTON, D. C.

(No Model.) 3 Sheets—Sheet 2.

R. S. PEASE.
MANUFACTURING GLASS.

No. 444,560. Patented Jan. 13, 1891.

Witnesses:
James F. Duhamel
Horace A. Dodge

Inventor
Roger S. Pease,
by Dodge Sons
Attys.

(No Model.)  R. S. PEASE.  3 Sheets—Sheet 3.
MANUFACTURING GLASS.
No. 444,560.  Patented Jan. 13, 1891.

UNITED STATES PATENT OFFICE.

ROGER S. PEASE, OF ROSE, ASSIGNOR OF ONE-HALF TO ARTHUR E. BOWE, OF ST. PAUL, MINNESOTA.

MANUFACTURING GLASS.

SPECIFICATION forming part of Letters Patent No. 444,560, dated January 13, 1891.

Application filed April 26, 1890. Serial No. 349,660. (No model.)

*To all whom it may concern:*

Be it known that I, ROGER S. PEASE, a citizen of the United States, residing at Rose, in the county of Ramsey and State of Minnesota, have invented certain new and useful Improvements in Manufacturing Glass, of which the following is a specification.

My invention relates to the manufacture of glass, and is applicable to the production of plate, window, and sheet glass of all varieties, to the making of pipes, cylinders, or tubes, and with certain further appliances and details to the manufacture of numerous special articles.

The present matter has to do only with the broad general principle upon which my invention is based, embodied in suitable mechanism for carrying the same into practice, the mechanism here illustrated and described being merely one of many forms that may be adopted.

In the following description and in the annexed drawings I shall avoid, as far as practicable, all unnecessary details, in order to preclude uncertainty or mistake as to the leading and important features or elements of the invention and of the machinery for carrying out that invention; or, in other words, I shall describe and illustrate a very simple embodiment of the invention which practical tests have demonstrated to be satisfactory and efficient.

Briefly stated, the invention consists in the manufacture of plates, sheets, or films of glass of any desired form by means of a plunger or slide of the desired form moving upward through a mass of molten glass or metal and carrying up with it a layer or film of the metal (one or more) of a thickness controlled primarily by the consistency of the glass or metal. In passing upward through the molten glass or metal the upper end of the plunger or slide receives upon and across it a layer or body of the glass, forming a sort of saddle, which sustains the film or sheet formed upon the side or sides of the plunger or slide. As the upper end of the plunger or slide rises above the level of the molten metal, the saddle or body of glass upon said end is chilled by exposure to the air, sets, and cannot thereafter be drawn out or elongated, and as fast as the plunger or slide rises the portion connected with and drawn up by the saddle likewise sets. It therefore follows that the drawing out of the film or sheet occurs at or about the level of the molten metal, and so long as the consistency of the metal remains the same the thickness of the film, sheet, or layer must and will likewise continue uniform. This gaging of the thickness is a fact demonstrated by actual tests. It is desirable under some circumstances to strip the film or sheet from the plunger just previous to its becoming completely set, or while it is still in a plastic condition, this, however, depending upon various conditions, which need not be here recited. When desirable, this may be effected by inserting between the plunger and the film a rod or bar of wood or metal and holding the same in a fixed position during the upward movement of the plunger, or in any other convenient way. By thus stripping the glass from the plunger I prevent adhesion thereto, which might interfere with the withdrawal of the plunger or removal of the film, and I permit air to enter between the plunger and the film, thus causing the glass to cool evenly on both faces and prevent warping or crinkling. I do not, however, mean to be understood as necessarily stripping the sheet or film from the plunger, but only as setting forth the provision made for different contingencies and for certain classes of manufacture.

Figure 2:
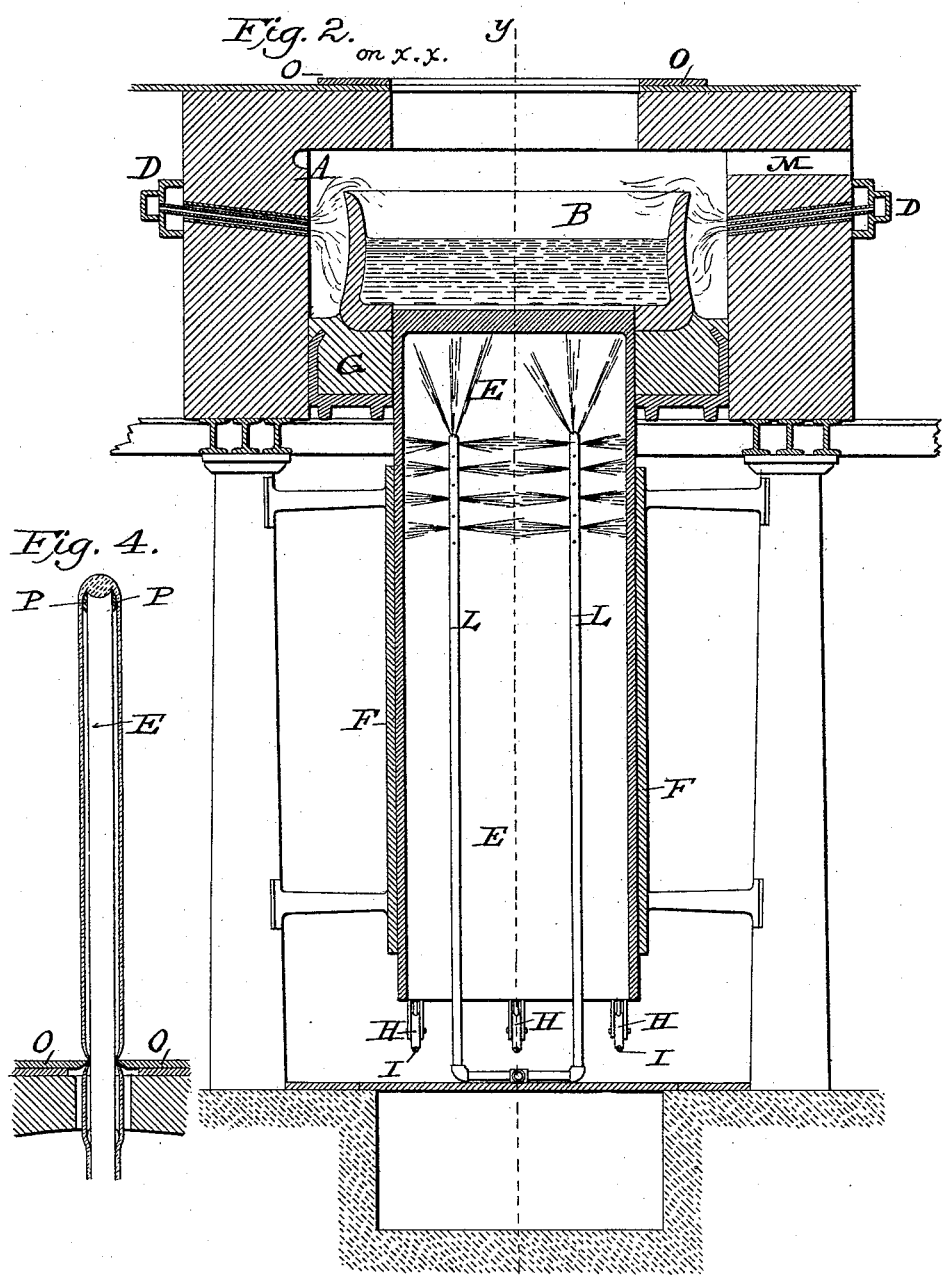
Figure 3:
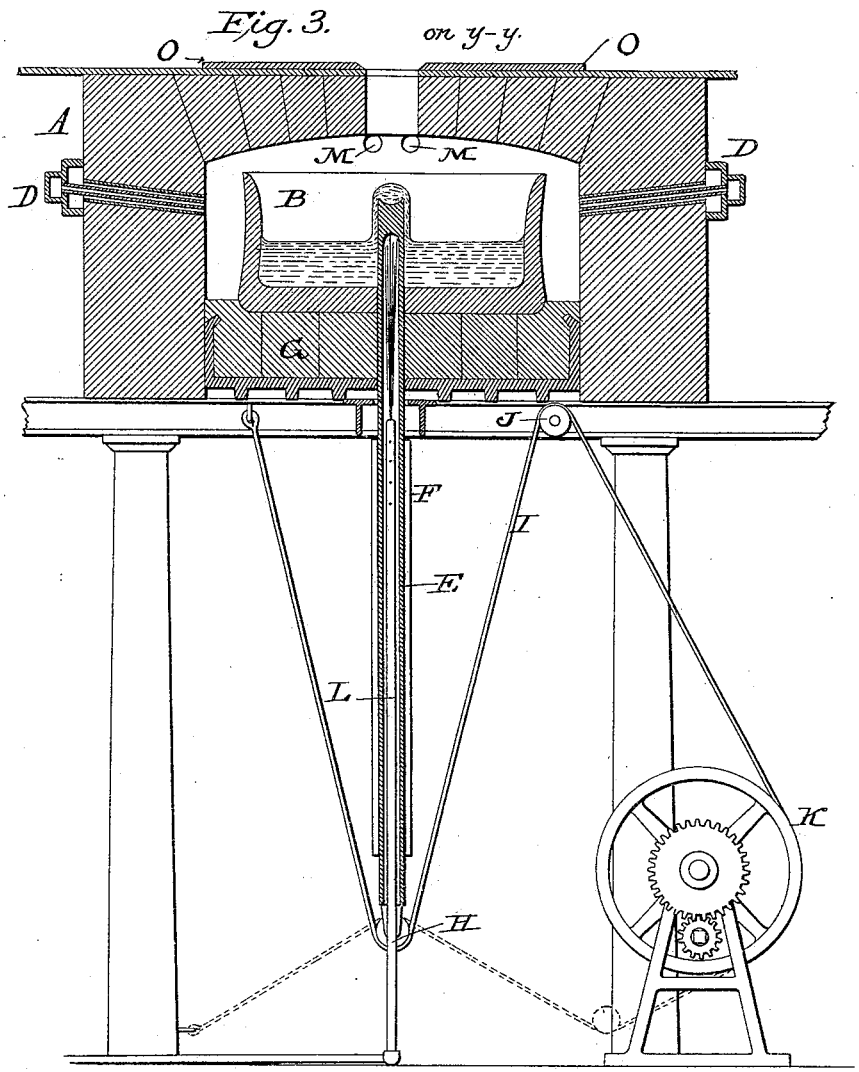
Figure 6:
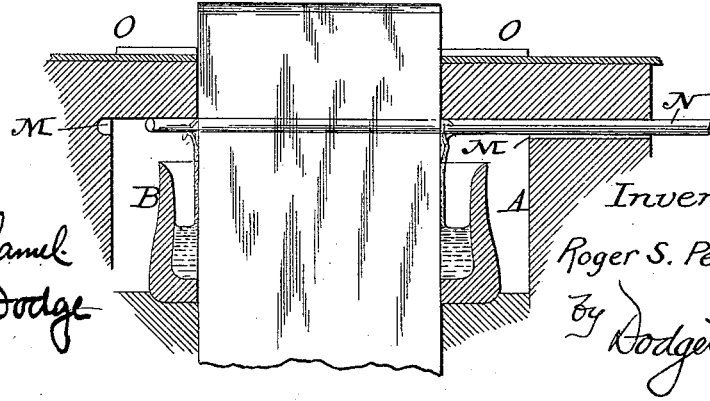

Referring now to the annexed drawings, Figure 1 is a top plan view of my improved apparatus in one of its contemplated forms; Fig. 2, a vertical section on the line $x\, x$ of Fig. 1; Fig. 3, a vertical section on the line $y\, y$ of Fig. 1; Fig. 4, a sectional view showing the glass carried up by the plunger, but stripped from the surface thereof, and also showing the cut-off slides thrown inward to sever the sheets; Fig. 5, a perspective view of the plunger with the glass upon it, showing the manner of inserting the stripping-pieces; Fig. 6, a view illustrating the action of said pieces.

A indicates a chamber, which may be of any desired form and of any suitable dimensions and materials, and B a vessel or receptacle, here represented as contained within said chamber and adapted to contain the molten glass or metal.

For purposes of illustration, and as indicating the preferred arrangement, I have in Fig. 1 represented the chamber A as located within a group of melting-furnaces, (indicated merely in outline,) said melting-furnaces communicating with and designed to successively deliver molten glass or metal to the vessel B.

In order to maintain the contents of vessel B at the desired temperature and preserve a proper consistency of the metal, I provide for heating the chamber A. This may be most conveniently done and with the necessary uniformity through the employment of gas, which is introduced with air in proper proportion through nozzles or burners D, Figs. 2 and 3, which may be of any approved or usual construction.

E indicates a plunger or slide, the cross-section of which may be varied according to the character of the work to be performed—that is to say, if smooth flat sheets are to be produced the face or faces of the plunger will be plane surfaces; but if corrugated or curved sheets, cylinders, or the like are to be made the cross-section of the plunger will be correspondingly altered.

The plunger or slide E is carried in guides or ways F below the chamber A and passes upward through the chamber and the vessel B when operated, as hereinafter explained. Prior to being elevated in action the plunger stands, advisably, with its upper end or edge about on a level with the bottom of the vessel B, or with the lower line of the molten glass therein, in which position the plunger will be in great measure protected by the fire-brick support G of the vessel B from the heat of the molten glass or metal. To elevate the plunger I propose to employ any suitable mechanism, such as rack and pinion, water column, or the like, though in practice I prefer the arrangement represented in Figs. 2 and 3. Under this plan the lower end of the plunger is provided with a pulley or pulleys H, preferably two or more, and a flexible band or cable I passes from a fixed support on one side of the plunger close to the lower side of chamber A to and under each pulley H of the slide, thence to and over a guide-pulley J on the opposite side of the plunger or slide, and finally to a drum or windlass K, by which the cable or cables may be wound or unwound as required.

In practice it is deemed advisable to provide several cables to guard against breakage of one and possible stoppage of the machinery or injury to workmen in consequence.

The drum or windlass may be turned manually or by suitable power, as found expedient.

It is probable that notwithstanding the withdrawal of the plunger from the glass or metal after each operation and its exposure to the air the intense heat to which it is subjected while passing through the glass or metal might cause it to warp or bend and otherwise interfere with its proper and efficient operation unless provision were made against such contingency. I therefore propose in some cases, particularly where the plunger is very large and its mass sufficient to hold the heat for a considerable time, to make it hollow and to cool it internally by means of water, either sprayed into it or arranged to run continuously through its interior; or any of the gases used for producing intense cold, as in ice-making, may be made use of for cooling the plunger, suitable outlet being provided in all cases for the spent water or gas.

In Figs. 2 and 3 of the drawings I have represented the plunger as hollow, and have shown two upright pipes L extending upward therein to near the base of chamber A. These pipes are preferably perforated at their upper ends to spray water upon the interior of the plunger; but they may act merely as inlet and outlet pipes for water or gas, in which case, however, one should be enough larger than the other to permit free discharge and prevent internal pressure through expansion and inability to escape. If used as circulating-pipes, there will be suitable packing-glands at the points where the pipes pass through the lower end of the plunger in order to prevent leakage around the pipes.

The weight of the plunger will ordinarily be sufficient to cause it to descend when permitted to do so; but, if desired, a cable or cables may be carried from a fixed support at one side of the plunger over a pulley or pulleys on the lower end of the plunger beneath a guide-pulley at the opposite side of the plunger and thence to drum or windlass K, winding thereon in a reverse direction from the cable I, so that as one winds upon the drum the other shall wind off, as indicated by dotted lines in Fig. 3.

The drum will of course be turned in one or the other direction, according to the direction in which the plunger is to move.

When glass is run in a molten state directly upon a flat bed or table, as is commonly done in the manufacture of plate-glass at the present time, enough air is caught and held between the glass and the bed to affect by its expansion and by the liberation of its component gases the evenness of the surface of the glass. This difficulty is greatly lessened by the plan of operation herein set forth and may be entirely eliminated, yet to guard against possible difficulty from this source, and particularly for the purpose of permitting air to enter between the inner surface of the glass sheet or film and the plunger and to cool both at the same time that the outer face of the glass is being cooled, I provide for stripping the glass from the plunger at such point in the operation as best admits of so doing. The precise point may vary, but the stripping must be done before the glass sets and begins to contract.

The distance between the top of the molten glass or metal and the point at which the plunger emerges from chamber A into the surrounding air may influence the determination of the point in question, or the operation may be performed even after the glass is exposed to the air.

In Figs. 2 and 3 I have indicated openings M at each side of chamber A between the top of the vessel B and the ceiling or roof of chamber A, said opening being in line with the side faces of the plunger E. Through these holes I insert rods or bars N, of metal or of wood, passing them entirely across the chamber A and into or through similar openings M at the opposite side. The rods or bars thus entered pass between the plunger and the glass thereon in the manner indicated in Fig. 5, while the glass or metal is still soft or plastic, the plunger being momentarily held at rest to permit their insertion. Being held at their ends in the openings M, the rods or bars cannot rise. Hence when the plunger resumes its upward movement the bars or rods will effectually strip the glass from the plunger, which immediately thereafter protrudes above the chamber A and exposes the glass at its upper end to the air. The glass so exposed promptly sets and retains thereafter the shape and dimensions thus acquired. This description applies only to one form and arrangement of stripping device and to stripping within the chamber A; but I do not restrict myself either to the devices set forth or to effecting the stripping at the point indicated, these matters depending greatly upon the size and thickness of the glass and upon various other considerations.

In the drawings I have represented the plunger as flat, or in the form of a rectangle, with two plane faces, the two narrow edges being represented as traveling so close to the ends or walls of the openings through the bottom and top of the vessel B and chamber A as to preclude the entrance of glass between them, the ends of the openings in the roof or top of chamber A acting as scrapers to remove any glass which may be carried up on said edges. Other forms of scraper may obviously be substituted. Under this arrangement two sheets or plates are produced at the same time; but if a pipe, cylinder, or like body be required the plunger, which will in such case be of a cross-section corresponding with that of the intended product, will not be permitted to touch the vessel B or the roof of chamber A at any point. When the plunger rises to the required height to produce a sheet or sheets of the desired size, a severance of the sheet or sheets from the plastic glass in vessel B is effected by forcing inward toward and against the slide or plunger cut-off plates O, which may be operated manually or mechanically.

I propose hereafter to explain and patent various mechanical contrivances not necessary to the present description, by which different parts of the process herein described may be more expeditiously carried out; but they constitute separate inventions and are independent of what is herein claimed.

While the plunger of the form illustrated is in its elevated position, as indicated in Fig. 4, bars or rods P are or may be inserted between the glass and the plunger just beneath the saddle or connecting portion of the glass and the glass lifted off or the plunger drawn down from between the two plates, leaving the glass free to be carried to the annealing-oven, where it may be hung instead of being laid flat, as is the customary way. This, however, is optional and outside of the present invention.

It is deemed advisable to cause the plunger to move vertically; but I do not mean to restrict myself to such vertical movement, as some classes of work admit of a different arrangement and operation.

The essence of my invention consists in moving a plunger upward through a mass of molten glass or metal of uniform consistency, and thereby raising and carrying upward from said mass a film or sheet of uniform thickness, and this I believe to be new, broadly, and without regard to the details of the apparatus employed for the purpose.

The maintenance of uniform consistency throughout the drawing operation is important, and as a step in the process is also believed to be new.

I find it advantageous to make the plunger with a semicircular groove in its upper edge, as a thicker body of glass is thereby caused to form across its end, as indicated in Figs. 3 and 4.

It is to be understood that the vessel or chamber in which the molten metal is contained is a mere containing vessel or receptacle, and not a mold, that the plunger does not force the metal into contact with the sides of the chamber, or by displacement cause it to fill the same, but, on the contrary, merely lifts up or draws from the fluid or plastic mass the desired film or sheet without any molding action whatever. The operation is therefore to be distinguished from the formation of pipes and the like by a "progressive" system of molding, consisting in pouring molten metal into a mold having a vertically-movable central core, which is elevated as the pouring progresses. The apparatus is likewise to be distinguished from that employed in carrying out the aforesaid progressive system of molding, in that no mold is employed by me, and my plunger, instead of being pointed so as to penetrate and pass through the molten metal, is so fashioned as to hold and carry up across its upper end a body of the metal.

Having thus described my invention, what I claim is—

1. The herein-described method of producing sheets, plates, and films, which consists in passing a plunger upward through and above a mass of molten glass or metal and permitting it to set while held above said mass.

2. The method of producing plates, sheets, and films of uniform thickness, which consists in melting a mass of glass or metal, maintaining it constantly of uniform consistency, passing a plunger upward through and above the mass, and permitting the film or coating carried upward by the plunger to set or harden.

3. In the manufacture of plates, sheets, and films, the following steps, viz: first, melting the glass or metal; second, passing a plunger upward through the molten mass; third, stripping the glass from the sides of the plunger while in a plastic condition, and, lastly, exposing the sheet or film to a chilling atmosphere and thereby causing it to set.

4. In combination with a vessel adapted to contain molten glass or metal, a plunger adapted and arranged to be moved upward through and above the mass of metal contained in said vessel and to carry upward upon its end and sides a body of the metal without forcing the same against the sides of the containing-vessel, substantially as and for the purpose set forth.

5. In combination with a vessel adapted to contain molten glass or metal, a plunger movable upward through the same, and means, substantially such as described and shown, for elevating the plunger, the space between the sides of the plunger and the walls of the vessel being sufficient to prevent the metal from bridging across and filling the space within the vessel as the plunger rises.

6. In combination with a vessel adapted to contain molten glass or metal, a plunger movable upward through the same, means, substantially such as described, for elevating the plunger, and cut-off plates or slides adapted to be thrown against the sides of the plunger.

7. In combination with a vessel other than a mold adapted to contain molten glass or metal, a plunger movable upward through the same, and means, substantially as described, for maintaining the contents of the vessel at a uniform temperature.

8. In combination with a vessel B, adapted to contain molten glass or metal, a plunger movable upward through the same, and one or more furnaces communicating with and serving to supply the vessel B.

9. In combination with chamber A, provided with openings M M, vessel B, located within said chamber, plunger E, movable upward through the vessel and the chamber, and rods or bars N, substantially as and for the purpose set forth.

10. In combination with a vessel for containing molten glass or metal, a plunger movable through the mass, and means, substantially as described, for cooling said plunger.

11. In combination with a vessel for containing molten glass or metal, a hollow plunger movable through the same, and a pipe extending into the plunger and serving to convey a cooling agent thereto.

12. In combination with chamber A, vessel B, and plunger E, cut-off plates O, adapted and arranged to be forced against the sides of the plunger, as and for the purpose explained.

13. In combination with vessel B and plunger E, cables I and drum or windlass K, all arranged to operate substantially as set forth and shown.

In witness whereof I hereunto set my hand in the presence of two witnesses.

ROGER S. PEASE.

Witnesses:
WILLIAM W. DODGE.
ARTHUR E. BOWE.